United States Patent
Okamoto et al.

[11] Patent Number: 5,969,456
[45] Date of Patent: *Oct. 19, 1999

[54] ELECTROMAGNETIC EQUIPMENT

[75] Inventors: Tetsushi Okamoto, Mie-ken; Yoshihiro Ito, Aichi-ken, both of Japan

[73] Assignee: Kabushiki Kaisha Toshiba, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/892,698

[22] Filed: Jul. 15, 1997

[30] Foreign Application Priority Data

Jul. 19, 1996 [JP] Japan ................... 8-190533

[51] Int. Cl.⁶ ............... H02K 3/30; H01F 5/06
[52] U.S. Cl. .............. 310/196; 174/127; 310/45
[58] Field of Search ................. 310/198, 201, 310/208, 215, 113, 115, 196, 45; 174/120 R, 120 C, 127

[56] References Cited

U.S. PATENT DOCUMENTS

| | | | |
|---|---|---|---|
| 2,757,298 | 7/1956 | Botts et al. | 310/208 |
| 4,398,112 | 8/1983 | Van Gils | 310/201 |
| 4,621,212 | 11/1986 | Torossian et al. | 310/260 |
| 4,760,296 | 7/1988 | Johnston | 310/45 |
| 5,574,325 | 11/1996 | Von Musil et al. | 310/215 |

FOREIGN PATENT DOCUMENTS

| | | | |
|---|---|---|---|
| 63-250010 | 10/1988 | Japan | H01B 7/02 |
| 1-321834 | 12/1989 | Japan | 310/201 |
| 2-106812 | 4/1990 | Japan | H01B 3/30 |
| 93-06646 | 4/1993 | WIPO | H02K 3/40 |

*Primary Examiner*—Thomas M. Dougherty
*Assistant Examiner*—Burt Mullins
*Attorney, Agent, or Firm*—Limbach & Limbach L.L.P.

[57] ABSTRACT

An electromagnetic equipment such as dynamoelectric machine includes an electromagnetic coil formed by winding an insulated wire. The insulated wire is made of a bare conductor having, on its surface, two layers of an insulating coating composed of a varnish and a low-resistance conductive coating composed of a heat resisting varnish containing a conductive oxide. A coil formed of the insulated wire is applied to the whole electromagnetic coil or a coil part near a power supply terminal.

10 Claims, 9 Drawing Sheets

A: POLYIMIDE RESIN
B: MIXTURE OF POLYIMIDE RESIN AND TRIION TETRAOXIDE
C: MIXTURE OF POLYIMIDE RESIN AND TALC

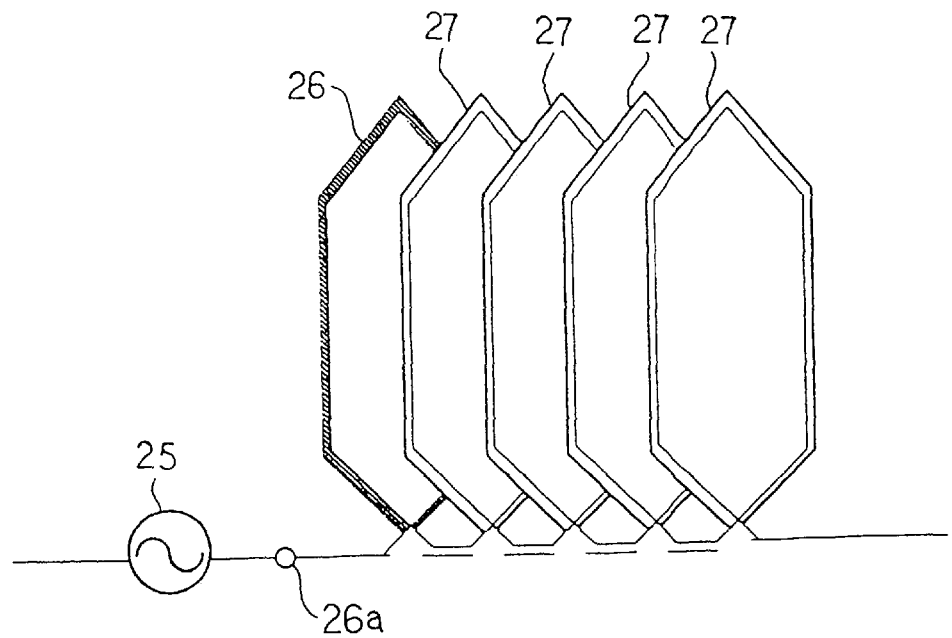
F I G. 9
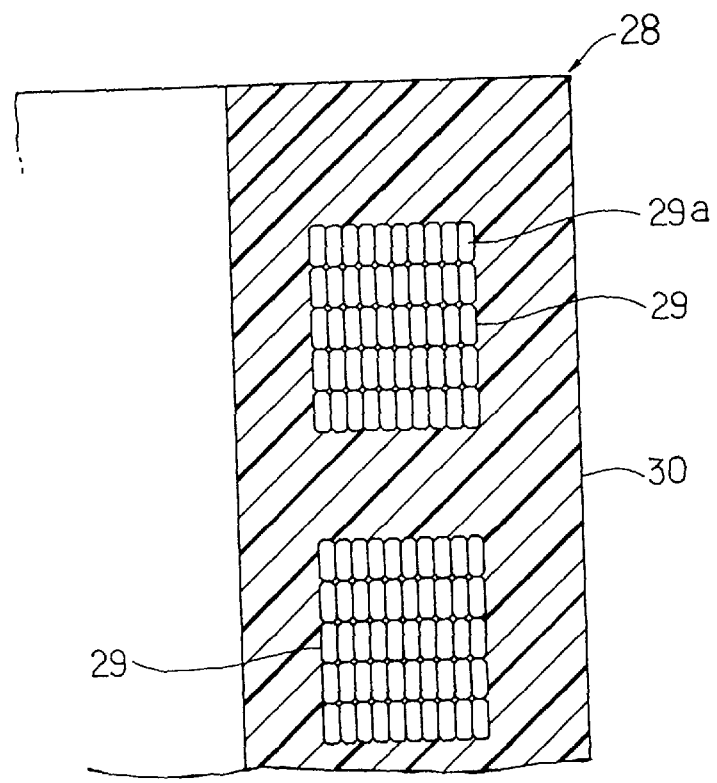
F I G. 10

ELECTROMAGNETIC EQUIPMENT

BACKGROUND OF THE INVENTION

1. Field of the Invention

This invention relates generally to an electromagnetic equipment comprising an electromagnetic coil such as transformers and dynamoelectric machines, and more particularly to such an electromagnetic equipment having improved corona resistance, dielectric strength and heat resistance.

2. Description of the Prior Art

The electromagnetic equipment of the above-described type includes induction machines such as dynamoelectric machines and transformers. Conventional induction machines comprise an electromagnetic coil formed by winding enameled wires serving as insulated wires. In the electromagnetic coil, generally, insulators deteriorate when exposed to corona discharge. In the prior art, however, the corona discharge cannot be controlled so as to reduce a quantity of electric charge discharged by the corona discharge, whereupon each insulator has a low deterioration resistance, namely, a low corona resistance. In the prior art electromagnetic coil, furthermore, an impulse voltage is unequally shared by coil portions. The unequal sharing of voltage tends to result in dielectric breakdown in a coil potion sharing an excessively high voltage. The prior art electromagnetic coil thus has a low dielectric strength. As a result, the electromagnetic coil has a difficulty in reducing a thickness of each insulator so that the size of the induction machine is reduced.

To solve the above-described problem, the prior art has provided two layers of polyester film 2 wound on a conductor 1 and mica foil 3 interposed between the polyester film layers, as shown in FIG. 13. Furthermore, the prior art has provided a polyester film 5 wound on a surface of a unit coil 4 having a plurality of turns and a mica tape 6 wound on a surface of the polyester film 5, as shown in FIG. 14. Since each prior art construction uses the mica foil 3 and the mica tape 6 respectively, they are superior in a resistance against electrical discharge, namely, in the dielectric strength. However, each construction is insufficient in the corona resistance since a quantity of electric charge discharged by the corona discharge cannot be restrained.

SUMMARY OF THE INVENTION

Therefore, an object of the present invention is to provide an electromagnetic equipment which has a low degree of deterioration of the insulators due to the corona discharge, namely, a high corona resistance, a high insulation strength because of equalized sharing of voltage in the coil, and an improved heat resistance of the coil.

The present invention provides an electromagnetic equipment comprising an electromagnetic coil formed by winding an insulated wire comprising a bare conductor having two layers of an insulating coating formed by applying a varnish to a surface thereof and baking the varnish and an outer coating formed by applying coating paint to a surface of the insulating coating and baking the coating paint, the outer coating having a lower resistivity than the insulating coating, the coating paint comprising a mixture of a varnish and an additive containing either triiron tetraoxide or talc.

According to the above-described construction, a quantity of electric charge discharged by the corona discharge can be restrained by the outer coating formed on the bare conductor. Consequently, the corona resistance of the electromagnetic equipment can be improved. Furthermore, the outer coating increases a capacitance between coil conductors, namely, a series capacitance. Consequently, since the voltage is equally shared by the coils of the electromagnetic coil, the insulation strength of the electromagnetic equipment relative to the impulse voltage can be improved.

In preferred form, the electromagnetic coil is divided into a plurality of unit coils each having a plurality of turns. Furthermore, the electromagnetic equipment comprises a conductive coating member covering an outer periphery of each unit coil so that the corona resistance of each unit coil to the ground is improved.

In another preferred form, the outer coating is formed at least on a portion of the electromagnetic coil in the vicinity of a winding end connected to a power supply.

In further another preferred form, at least one of the block coils constitutes a tap coil in a tapped electromagnetic coil and the outer conductive coating is formed at least on the insulating wire forming the tap coil.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 9 schematically illustrates a coil arrangement in a fourth embodiment in accordance with the present invention;

FIG. 10 is a schematic sectional view of the coils enclosed in a resin in a fifth embodiment in accordance with the present invention;

DETAILED DESCRIPTION OF THE PREFERRED EMBODIMENTS

Figure 1:
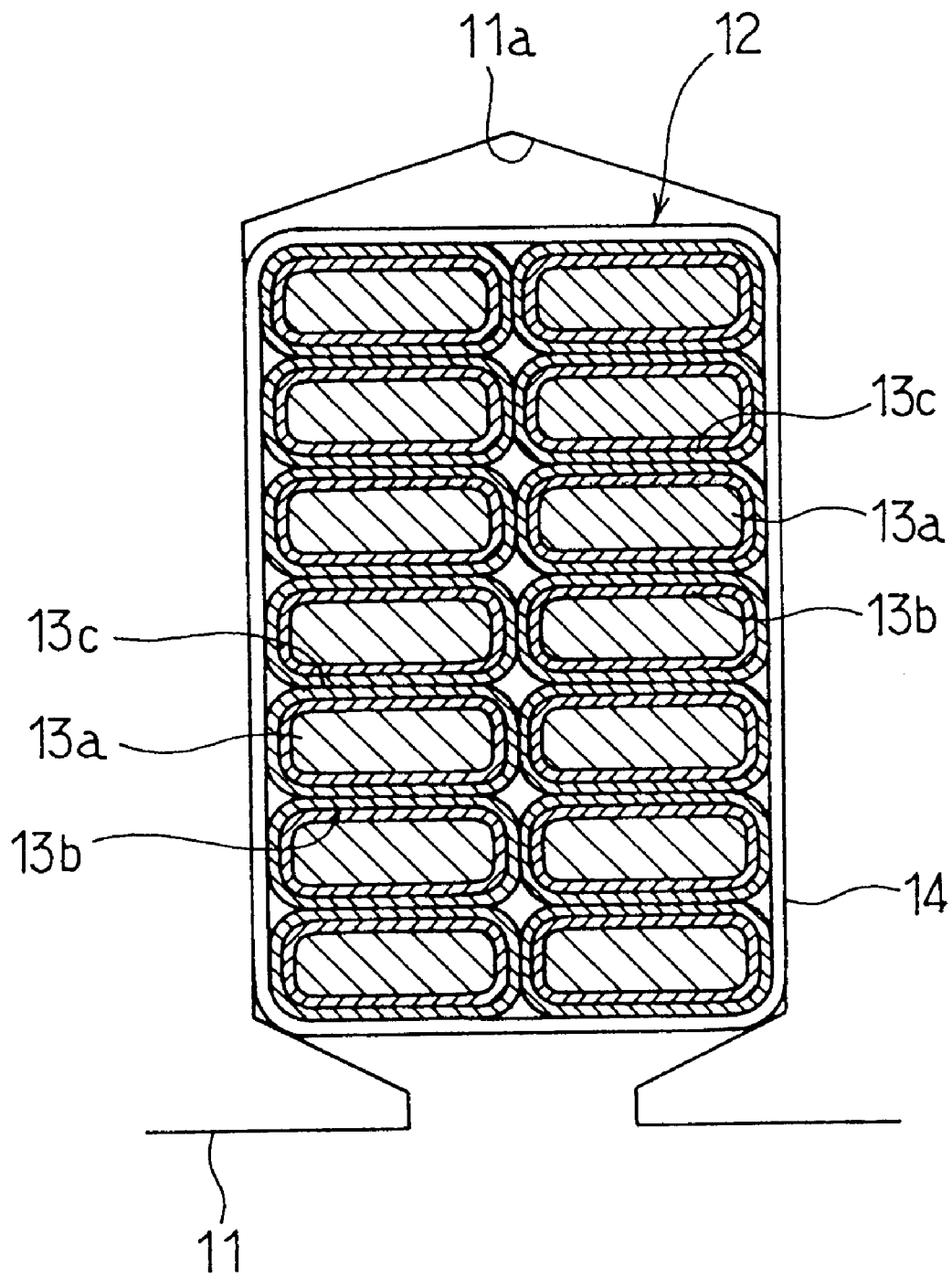
FIG. 1 is a sectional view of coils embedded in one of slots in a high-voltage dynamoelectric machine of a first embodiment in accordance with the present invention.
Figure 2:
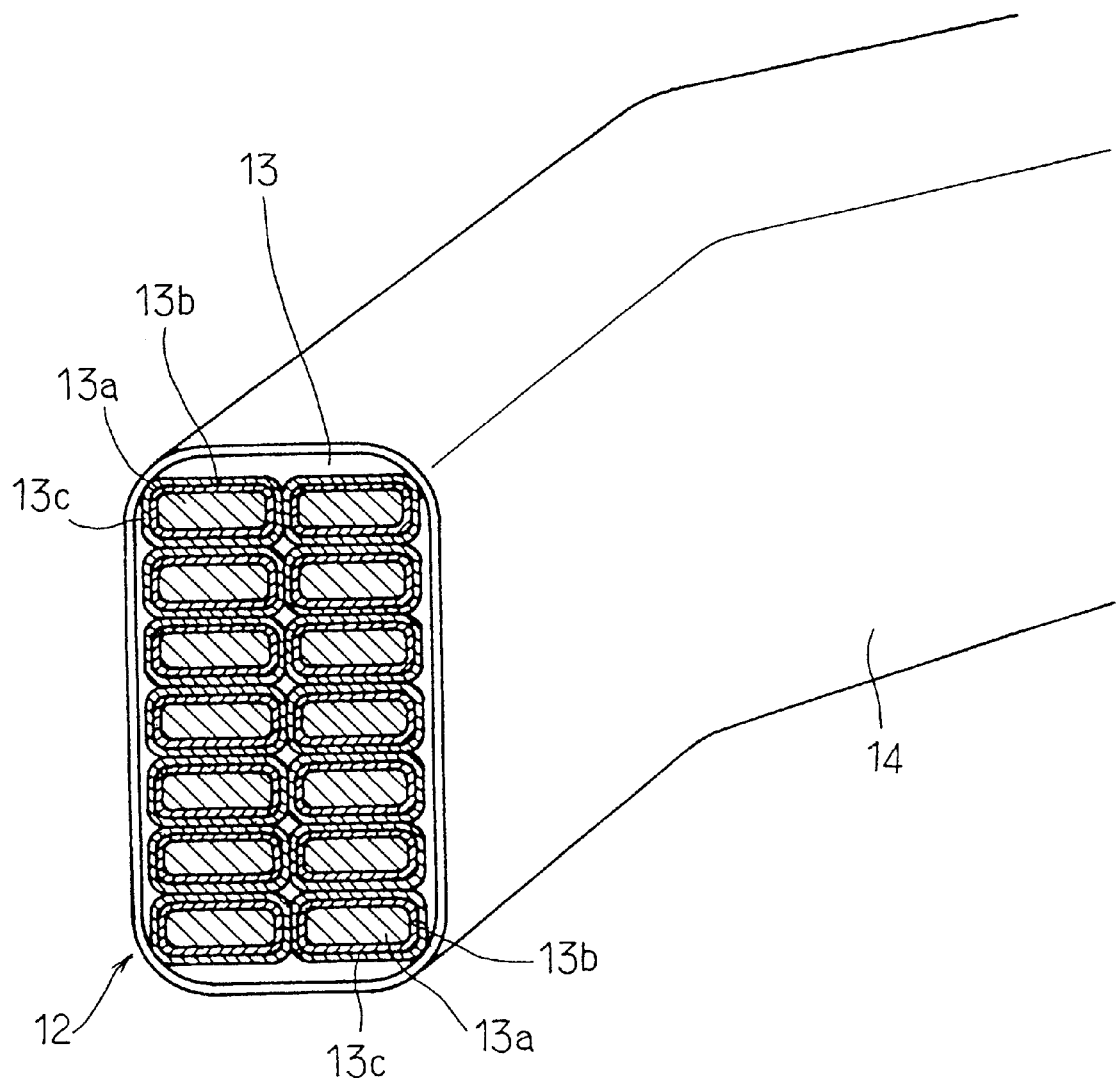
FIG. 2 is a broken perspective view of a unit coil assembly to be embedded in the slot.
Figure 3:
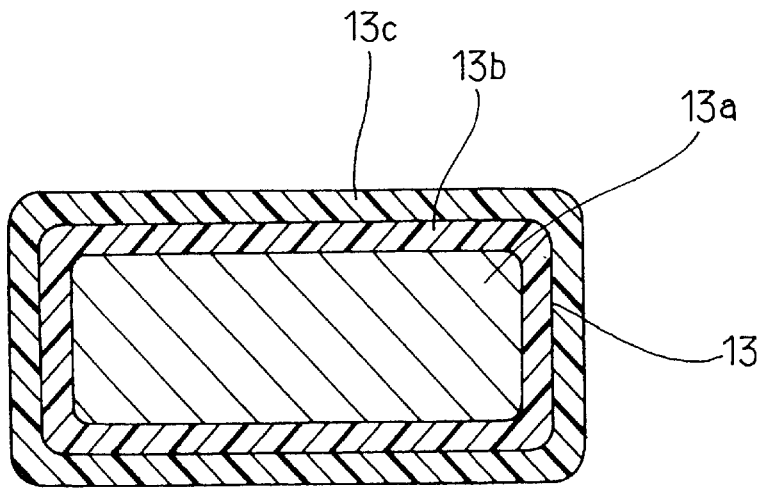
FIG. 3 is an enlarged sectional view of an insulated wire for forming the coil.

A first embodiment in accordance with the present invention will be described with reference to FIGS. 1 to 6. Referring to FIG. 1, an induction equipment or more specifically a high-voltage dynamoelectric machine embodying the electromagnetic equipment of the invention is shown. The dynamoelectric machine comprises an iron core 11 having a plurality of slots 11a in each of which an electromagnetic coil 12 is embedded. Only one of the slots 11a is shown. The electromagnetic coil 12 comprises a coil portion formed by winding an insulated wire 13 a plurality of turns and a mica tape 14 covering an outer periphery of the coil portion, as shown in FIG. 2. The mica tape 14 serves as a heat-resisting insulating coating member. The insulated wire 13 comprises a bare conductor 13a having a non-insulated outer peripheral surface and a heat-resisting insulating coating 13b formed on the outer peripheral surface of the bare conductor 13a, as shown in FIG. 3. An outer coating coating 13c is formed on the outer peripheral surface of the insulated wire 13 or more specifically, a peripheral surface of the insulating coating 13b.

The inner insulating coating 13b is formed by painting and baking a varnish belonging to the type having a heat resistance lower than the high-voltage dynamoelectric machine. For example, class A, B or E varnish is used when the dynamoelectric machine is designed to have a maximum allowable working temperature of 155° C. (class F). Furthermore, the outer low-resistance conductive coating 13c is formed by painting and baking an insulating varnish comprising a mixture of polyimide resin and triiron tetraoxide ($Fe_3O_4$), talc or silica. The content of triiron tetraoxide, talc or silica is prepared to range between 5 and 100 parts by weight when the content of polyimide resin is 100 parts by weight. TABLE 1 shows the volume resistivity of each of the polyimide resin, a sample in which 50 parts of triiron tetraoxide by weight is added to 100 parts of polyimide resin by weight, and a sample in which 50 parts of talc by weight is added to 100 parts of polyimide resin.

TABLE 1

| Additive | Volume resistivity | | |
|---|---|---|---|
| | No additive | Triion tetraoxide | talc |
| Volume resistivity in Ωcm | $4 \times 10^{15}$ | $1 \times 10^{7}$ | $2 \times 10^{10}$ |

As obvious from TABLE 1, the volume resistivity of the outermost coating 13c of the insulated wire 13 is decreased when triiron tetraoxide or talc is added to polyimide resin.

The electromagnetic coil 12 shown in FIGS. 1 and 2 constitutes a unit coil (a coil for each one slot) for the dynamoelectric machine. Accordingly, a plurality of series connected electromagnetic coils 12 constitute coils per phase per pole in the dynamoelectric machine.

Figure 4:
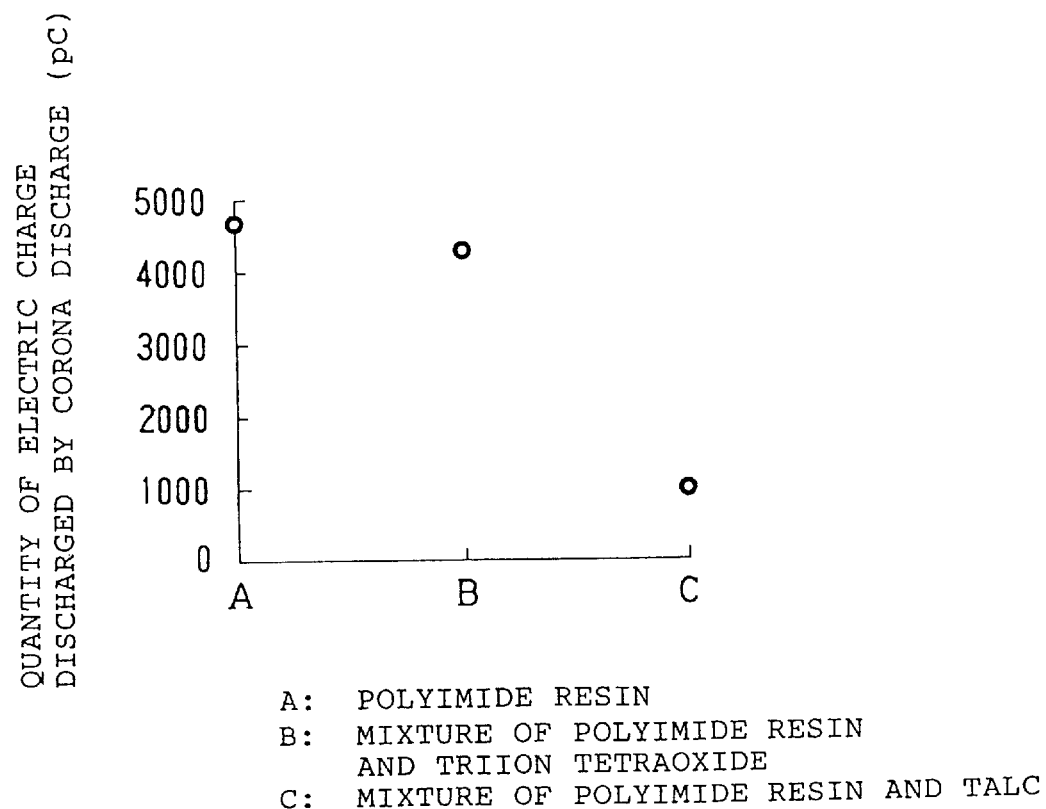
FIG. 4 is a graph showing measured values of a quantity of electric charge discharged by the corona discharge.

FIG. 4 shows quantities of electric charge discharged by the corona discharge in one cycle period when a voltage of 720 V, 60 Hz is applied to an enameled wire A comprising a bare conductor on which polyimide resin is baked, an enameled wire B comprising the enameled wire A on which a mixture of polyimide resin and 50 parts of triiron tetraoxide by weight is baked, and an enameled wire C comprising the enameled wire A on which a mixture of polyimide resin and 50 parts of talc by weight is baked. The gross film thickness of the enameled wires A, B and C is 35 μm. As obvious from the comparison among the enameled wires A, B and C, a quantity of electric charge discharged by the corona discharge is reduced when triiron tetraoxide or talc is mixed with polyimide resin. Accordingly, since the heat-resisting outer coating 13c is formed on the surface of the insulated wire 13 in the embodiment, the quantity of electric charge discharged by the corona discharge is reduced. More specifically, since the quantity of electric charge discharged by the corona discharge is reduced, the corona resistance of each insulator of the electromagnetic equipment can be improved.

A voltage change rate (dV/dt) of a PWM signal is increased when the dynamoelectric machine is controlled by an inverter. Accordingly, reflection or resonance renders an applied voltage about twice as large as an output pulse voltage of the inverter. This excessively high voltage, namely, an impulse voltage is unequally shared by a plurality of electromagnetic coils. More specifically, it is known that about 80% of the voltage is shared by a coil portion nearest to a terminal connected to the inverter or a power supply terminal. This is described in detail in a Japanese patent application No. 62-284215 filed by the assignee of the present application and published under publication No. 1-129735.

Figure 5:
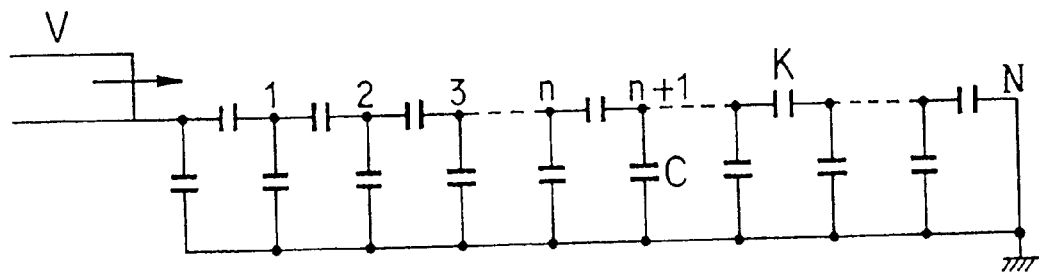
FIG. 5 shows a circuit equivalent to the coil.

FIG. 5 illustrates an equivalent circuit used for calculating a potential distribution in the coil upon occurrence of an impulse voltage. The following equation (1) is used to obtain an initial voltage of the coil to ground, which coil is an N-th coil on the basis of an end of the coil (line side end) connected to the power supply and corresponds to an N-th electromagnetic coil 12 in the embodiment:

$$Vn = V \cdot \sin h\alpha(1-n/N)/\sin h\alpha \quad (1)$$

where V is a peak value of applied voltage, N a total number of turns, and $\alpha = C/K$ where C is a total capacity to ground and K a total series capacity. When equation (1) is applied to the end of the coil on which the voltage is impressed, the following equation (2) is obtained since n<<N:

$$Vn = V e^{-\alpha(n/N)}. \quad (2)$$

Figure 6:
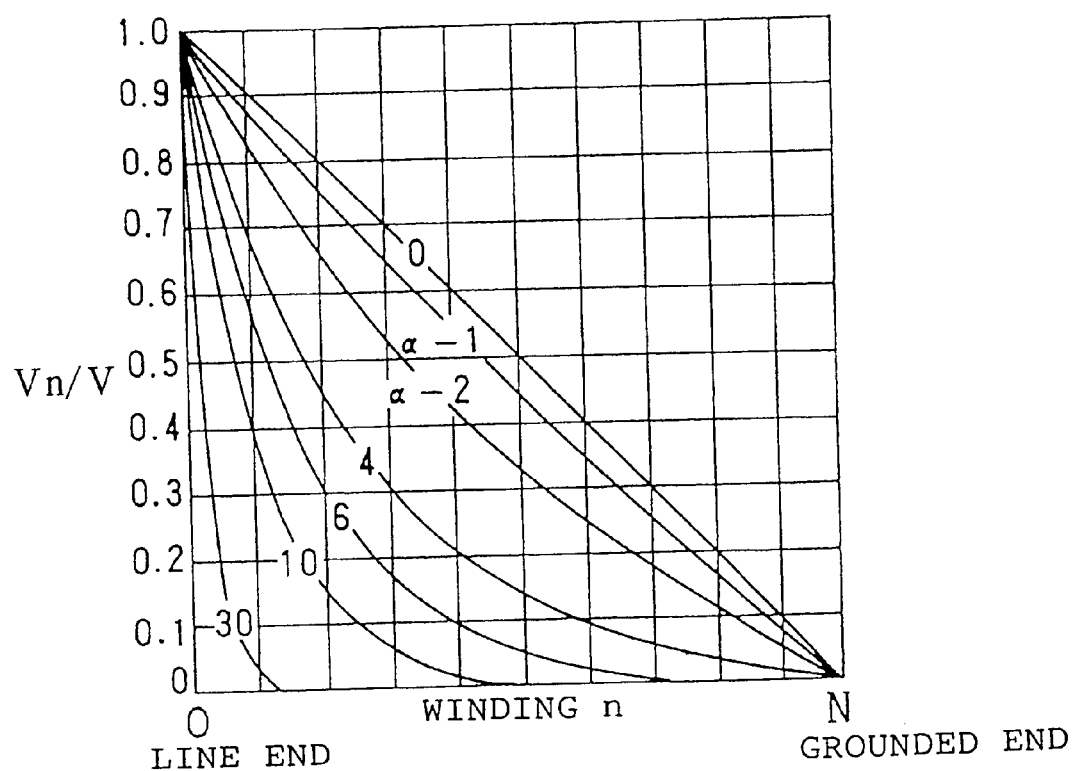
FIG. 6 is a graph showing distribution of shared voltages.

FIG. 6 shows a ratio of voltage Vn obtained from equation (1) to the applied voltage. The voltage shared by each coil becomes equal as α is approximated to 0. In order that the voltage shared by each coil is equalized, accordingly, the total series capacity K containing a floating capacity is increased to a large extent so that α becomes small.

The following TABLE 2 shows ratios obtained by dividing, by the dielectric constant of polyimide resin, the relative dielectric constant of varnish containing polyimide resin and 50 parts of triiron tetraoxide by weight and the relative dielectric constant of varnish containing polyimide resin and 50 parts of talc by weight.

TABLE 2

| Additive | No additive | Triiron tetraoxide | Talc |
|---|---|---|---|
| Ratio | 1 | 2.26 | 1.21 |

As obvious from TABLE 2, when the triiron tetraoxide or talc is added to the polyimide resin, the dielectric constant is increased so that the total series capacity K is increased. Accordingly, since the low-resistance conductive coating 13c is formed on the insulated wire 13 in the embodiment, the voltage shared by the electromagnetic coil 12 which is a unit coil nearest to the output terminal of the inverter is decreased when the dynamoelectric machine is driven by the inverter. Accordingly, the voltage shared by each of N of electromagnetic coils 12 is equalized. This equalization of shared voltages prevents occurrence of dielectric breakdown in the coil due to an increase in the shared voltage of the electromagnetic coil nearest to the inverter output terminal. In other words, the insulation strength is improved and accordingly, the reliability in the insulation performance of the dynamoelectric machine is improved.

The inventors made an experiment to obtain working temperatures at which dielectric breakdown of enameled wires occurs. In the experiment, an enameled wire A was formed by baking polyimide resin on a bare conductor. An enameled wire B was formed by baking polyimide resin containing triiron tetraoxide on the surface of the enameled wire A. An enameled wire C was formed by baking polyimide resin containing talc on the surface of the enameled wire A. A voltage of 1 kV, 60 Hz was applied to these enameled wires A, B and C so that they were deteriorated. The working temperatures at which dielectric breakdown occurred in 10,000 minutes were 20° C., 60° C. and 80° C. in respect of the enameled wires A, B and C respectively.

Accordingly, the heat-resisting property of the coil is improved in the embodiment since the low-resistance conductive coating 13c is formed on the surface of the insulated wire 13. Consequently, since the heat-resisting coating 13c comprising a varnish of the type having a lower heat-resisting property than that used in the prior art is sufficient, the manufacturing cost of the electromagnetic equipment is reduced. Moreover, since the density of current flowing through the coil 12 is rendered larger according to the improvement in the heat-resisting property, the sectional area of the electromagnetic coil 12 can be reduced. This reduction in the sectional area of the electromagnetic coil 12 reduces the size thereof, whereupon the size of the electromagnetic equipment is reduced. Furthermore, the mica tape 14 is wound on the outer periphery of the unit coil or electromagnetic coil 12. Consequently, the corona resistance of the coil to ground potential is improved.

In the foregoing embodiment, the insulating coating 13b is formed on the surface of the bare conductor 13a and the low-resistance conductive coating 13c is formed on the surface of the insulating coating 13b. However, the outer coating 13c may be formed on the surface of the bare conductor 13a and the insulating coating 13b may be formed on the surface of the outer coating 13c, instead. This formation of coatings can also increase the total series capacity K.

In the foregoing embodiment, furthermore, the insulating coating 13b is formed of the varnish of class A, B or E whose maximum allowable working temperature is lower than that of class F varnish. However, the insulating coating 13b may be formed of a varnish belonging to class F and having a relatively low heat resistance, instead. Furthermore, the insulating coating 13b may be formed of a varnish according to the heat resistance of the dynamoelectric machine. For example, the insulating coating 13b may be formed of esterimide resin when the dynamoelectric machine is classified into class F. The insulating coating 13b may be formed of polyimide resin when the dynamoelectric machine is classified into class H. Consequently, the heat resistance of the dynamoelectric machine can further be improved.

The invention is applied to the high-voltage dynamoelectric machine in the foregoing embodiment. The invention may be applied to oil-immersed transformers, for example. In this case, formal or methylal may be used as a base varnish when the oil-immersed transformer is classified into class F.

Figure 7:
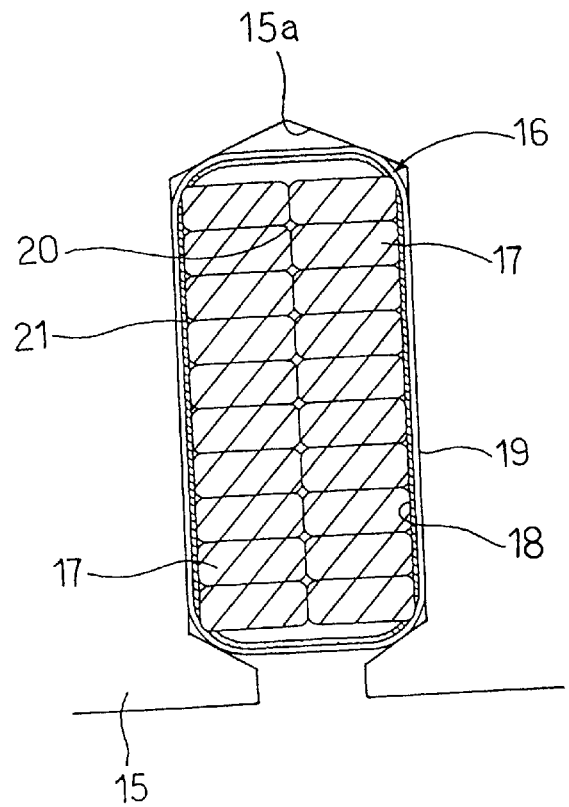
FIG. 7 is a view similar to FIG. 1, showing a second embodiment in accordance with the present invention.

FIG. 7 illustrates a second embodiment of the invention. The induction machine or a high-voltage former winding type dynamoelectric machine embodying the electromagnetic equipment of the invention comprises an iron core 15 having a plurality of slots 15a in each of which a single unit coil or an electromagnetic coil 16 is embedded.

The electromagnetic coil 16 is formed by winding an insulated wire 17. A conductive tape 18 serving as the conductive coating member covers an outer periphery of the electromagnetic coil 16. A mica tape 19 is further wound on a surface of the conductive tape 18. The low-resistance conductive coating is formed on the insulating coating of the insulated wire 17 in the same manner as in the first embodiment. The conductive coating is formed by painting and baking an insulating varnish comprising a mixture of polyimide resin and triiron tetraoxide, talc or silica in the same manner as in the first embodiment. The content of triiron tetraoxide, talc or silica is prepared to range between 5 and 100 parts by weight when the content of polyimide resin is 100 parts by weight. Reference numeral 20 designates wedge gaps formed between the insulated wires 17. Reference numeral 21 designates wedge gaps formed between the insulated wires 17 and the conductive tape 18.

According to the second embodiment, the low-resistance conductive coating is formed on the surface of the insulated wire 17. As the result of decrease in the volume resistivity as described in the first embodiment, surfaces of the members surrounding each wedge gap 20 are approximately at the same potential. Consequently, occurrence of corona discharge in each gap 20 is further restrained. Furthermore, since the conductive tape 18 covers the outer periphery of the electromagnetic coil 16, surfaces of the members surrounding each gap 21 are approximately at the same potential. Consequently, occurrence of corona discharge in each gap 21 is further restrained. Additionally, since the mica tape 19 is wound on the surface of the conductive tape 18, the corona resistance is improved against the corona discharge to ground or between the coil 16 and the core.

The slots 11a and 15a may completely be impregnated with the varnish in the respective foregoing embodiments. In this case, the mica tapes 14 and 19 are prevented from being peeled and the number of voids in the electromagnetic coil is decreased. Moreover, since the strength against machining defect is improved, the reliability in the insulation performance of the dynamoelectric machine is further improved.

Figure 8:
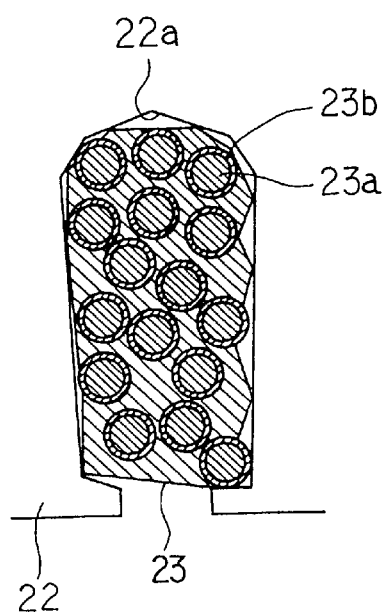
FIG. 8 is a view similar to FIG. 1, showing a third embodiment in accordance with the present invention.

FIG. 8 illustrates a third embodiment of the invention. The induction machine or a low-voltage random winding type dynamoelectric machine embodying the electromagnetic equipment of the invention comprises an iron core 22 having a plurality of slots 22a in each of which an electromagnetic coil 23 is embedded.

The electromagnetic coil 23 is formed by random winding an insulated wire 23a. The outer coating 23b is formed on the surface of the insulated wire 23a in the same manner as in the first embodiment. The outer coating 23b is formed by painting and baking the insulating varnish comprising the mixture of polyimide resin and triiron tetraoxide, talc or silica in the same manner as in the first embodiment. The content of triiron tetraoxide, talc or silica is prepared to range between 5 and 100 parts by weight when the content of polyimide resin is 100 parts by weight. The slots 22a are completely impregnated with varnish 24. The varnish 24 has the same composition as the outer coating 23b and functions of improving the insulation performance, fixing the electromagnetic coil 23, etc. Although the varnish 24 has the same composition as the outer coating 23b, for example, a varnish comprising polyimide resin or varnish containing no added conductive material may be used as the varnish 24, instead.

The outer coating is formed on the entire insulated wires forming the electromagnetic coil in the foregoing embodiments. However, as shown as a fourth embodiment in FIG. 9, the outer coating may be formed only on the insulated wires forming a first electromagnetic coil nearest to connection terminal 26a connected to a power supply 25 comprising an inverter. Or the outer coating may be formed only on a winding end (about a half turn, for example) of the insulated wire forming the electromagnetic coil 26 and connected to a power supply. In this case, the shared voltage of the first electromagnetic coil sharing highest impulse voltage is reduced such that the shared voltage is equalized among the electromagnetic coils 26 and 27. Furthermore, the insulating coating of each of the other electromagnetic coils 27 is thinned. Consequently, since a spacing factor is improved, the size of the dynamoelectric machine is reduced. Furthermore, since an amount of material for the outer coating is decreased, the outer coating in the fourth embodiment is advantageous from the economic point of view.

FIG. 10 illustrates a fifth embodiment of the invention. The induction machine or a transformer embodying the electromagnetic equipment of the invention comprises an electromagnetic coil 28 enclosed in a resin. This coil will be referred to as "molded coil." The molded coil 28 comprises a plurality of axially spaced apart block coils 29 and spacers (not shown) interposed between adjacent block coils. These block coils 29 are connected in series to one another.

The outer coating is formed only on the insulated wires 29a forming the first and last block coils 29 located at the beginning and termination of the winding respectively. The outer coating is formed by painting and baking the insulating varnish comprising the mixture of polyimide resin and triiron tetraoxide, talc or silica. The content of triiron tetraoxide, talc or silica is prepared to range between 5 and 100 parts by weight when the content of polyimide resin is 100 parts by weight.

In the molded coil of the transformer, each of the first and last block coils 29 located at the beginning and termination of the winding respectively shares a larger part of the impulse voltage when it is applied to the electromagnetic coil. However, since the outer coating is formed only on the insulated wires forming the first and last block coils 29 in the fifth embodiment, the corona resistance of the transformer is improved. Consequently, a resin layer 30 need not be thickened for improvement in the corona resistance, the molded coil 28 is thinned. Furthermore, since the voltage shared by the block coils 29 is equalized, the reliability in the insulation performance of the transformer is improved.

Figure 11:
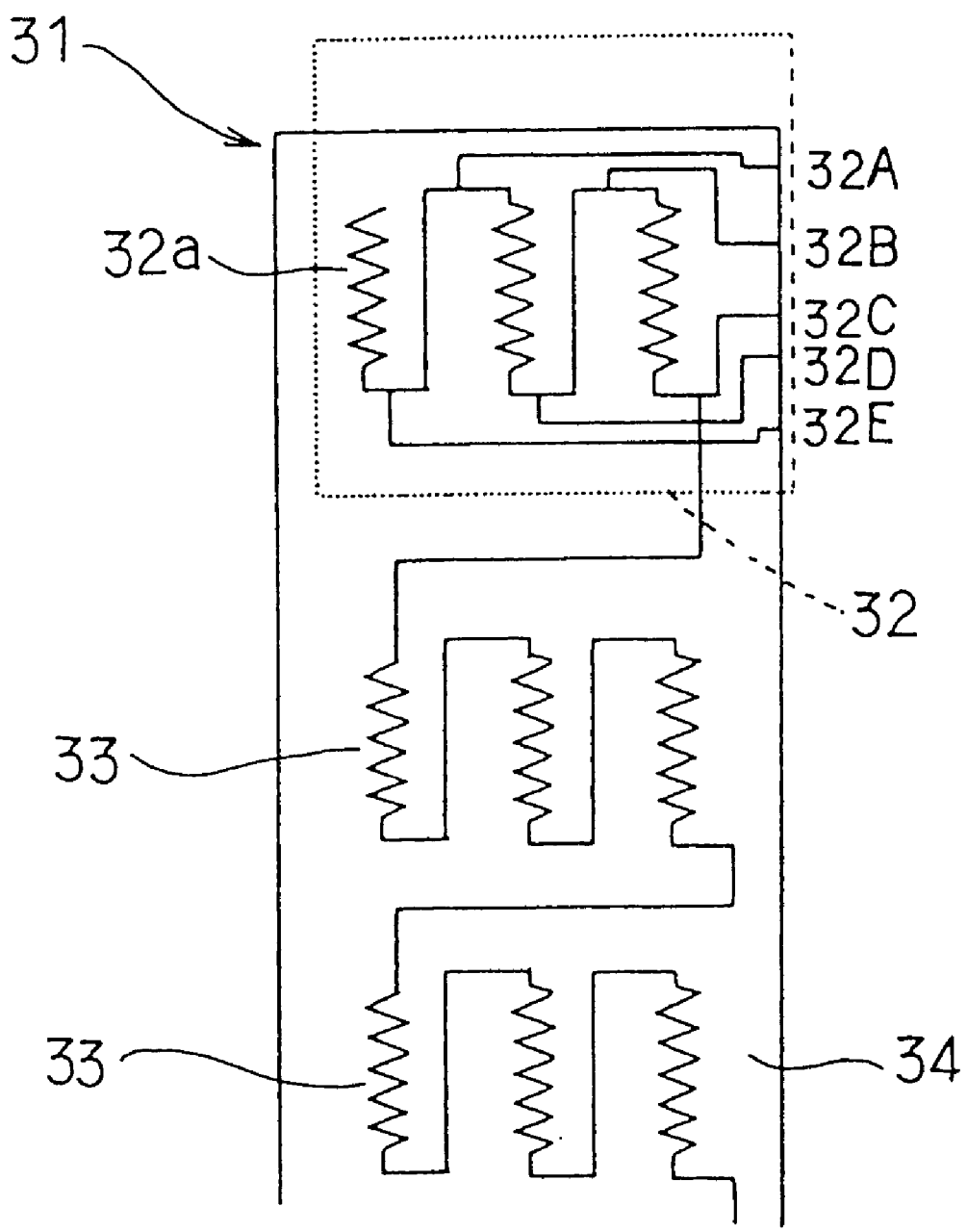
FIG. 11 is a diagrammatic view showing a coil arrangement in a sixth embodiment in accordance with the present invention.

FIG. 11 illustrates a sixth embodiment of the invention. The induction machine or a transformer embodying the electromagnetic equipment of the invention comprises a molded coil 31. The molded coil 31 comprises a tapped coil 32 serving as one block coil, a plurality of other block coils 33 and a resin layer 32 covering the tapped coil 32 and the block coils 33. The outer coating is formed only on the insulated wires forming the tapped coil 32. The conductive coating is formed by painting and baking the insulating varnish comprising the mixture of polyimide resin and triiron tetraoxide, talc or silica. The content of triiron tetraoxide, talc or silica is prepared to range between 5 and 100 parts by weight when the content of polyimide resin is 100 parts by weight. Reference symbols 32A, 32B, 32C, 32D and 32E designate taps of the tapped coil 32 respectively.

According to the sixth embodiment, for example, the use of the taps 32A and 32C results in an open loop coil portion 32a in the tapped coil 32. Since penetrating voltage waves are reflected on the open loop coil portion 32a, a large voltage is shared by the tapped coil 32. However, the outer coating is formed on the insulated wires of the tapped coil 32 in the sixth embodiment. Accordingly, since a quantity of electric charge discharged by the corona discharge is restrained, the corona resistance and insulation strength of the transformer are improved. As a result, the resin layer 34 need not be thickened, which results in a reduction in the size of the molded coil 31.

Figure 12:
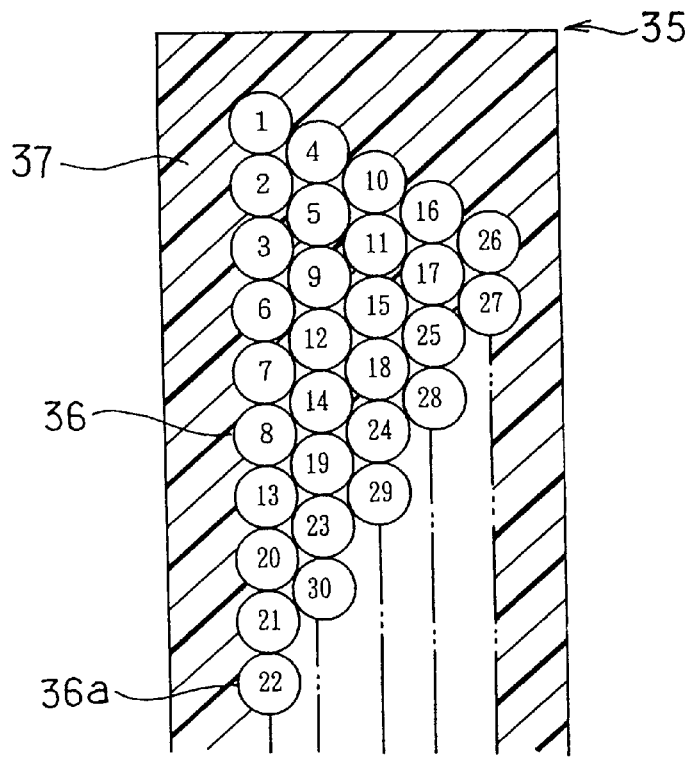
FIG. 12 is a view similar to FIG. 10, showing a seventh embodiment in accordance with the present invention.
Figure 13:
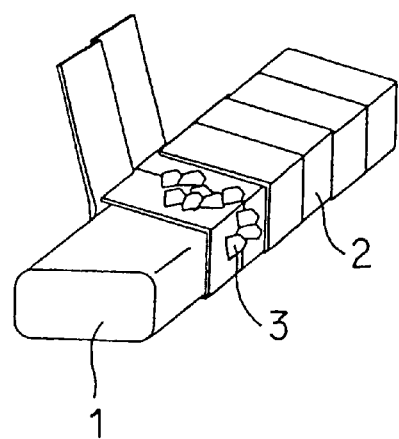
FIG. 13 is a perspective view of an insulated wire used in a conventional induction machine.
Figure 14:
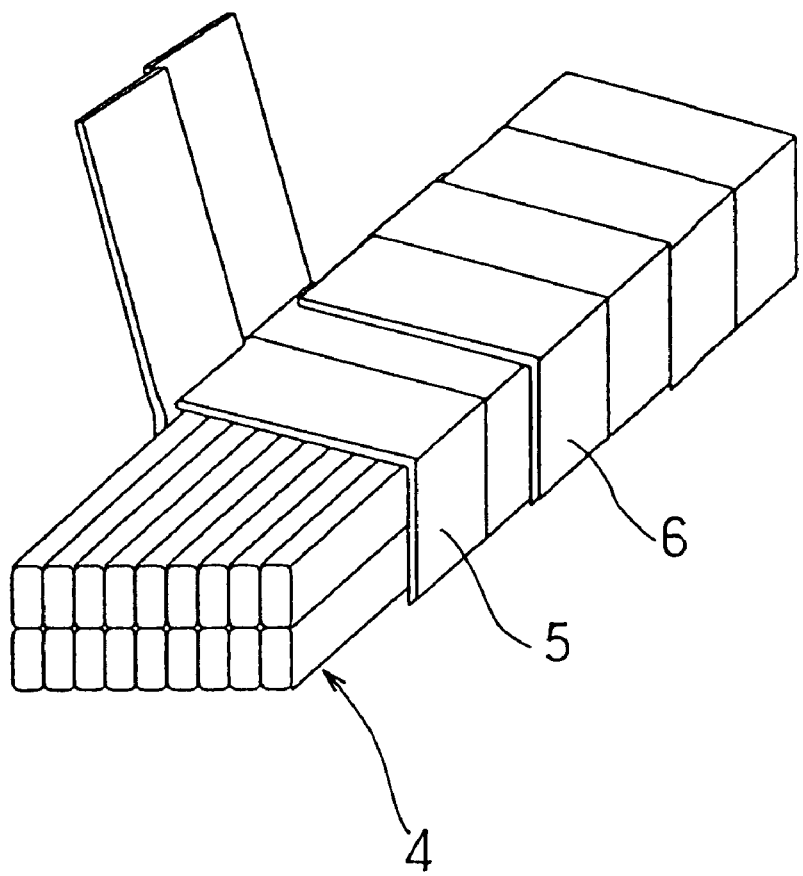
FIG. 14 is a perspective view of a unit coil assembly used in another conventional induction machine.

FIG. 12 illustrates a seventh embodiment of the invention. The induction machine or a transformer embodying the electromagnetic equipment of the invention comprises a molded coil 35. The molded coil 35 comprises an electromagnetic coil 36 formed by winding an insulated wire 36a into an inclined continuous winding and a resin layer 37 covering the coil 36. The outer coating is formed on the insulated wire 36a forming the coil 36. The outer coating is formed by painting and baking the insulating varnish comprising the mixture of polyimide resin and triiron tetraoxide, talc or silica. The content of triiron tetraoxide, talc or silica is prepared to range between 5 and 100 parts by weight when the content of polyimide resin is 100 parts by weight. The numerals 1 to 30 affixed to the insulated wire 36 in FIG. 12 indicate the order for winding the wire.

The corona resistance is improved and the molded coil 35 is thinned in the seventh embodiment, too. In the molded coil 35 using no spacers such as inter-stage paper between upper and lower coil layers as shown in FIG. 12, particularly, a large stress tends to act on the electromagnetic coil 36 when the coil is enclosed in the resin or when the coil is inserted into the slots of the iron core. However, the low-resistance conductive coating is formed on the insulated wire 36a forming the coil 36 in the seventh embodiment. Accordingly, since the mechanical strength of the coil is improved, the coil 36 can withstand a large stress without use of inter-stage paper.

Although the insulated wire 36a is wound into the inclined continuous winding in the order shown by the numerals in FIG. 12 in the seventh embodiment, the winding order should not be limited to this. Any winding order may be employed provided that the insulated wire 26a is rewound so as to fall between the lower wires. An example of the inclined continuous winding is described in detail in Japanese patent publication No. 9-97722 (1997) filed by the assignee of the present application.

Although the invention is applied to the electromagnetic coil 26 wound into the inclined continuous winding in the seventh embodiment, the invention may be applied to an electromagnetic coil wound into a normal tight winding. Thus, the invention can be applied to the The insulating varnish comprising the mixture of polyimide resin and triiron tetraoxide, talc or silica is used in the foregoing embodiments. However, an insulating varnish disclosed in Japanese patent application No. 7-305848 filed by the same assignee of the present application may be used, instead. The disclosed insulating varnish containing 5 to 100 parts of at least one type of inorganic fillers by weight when the content of polyimide resin is 100 parts by weight. The inorganic fillers comprises triiron tetraoxide, aluminum hydroxide, talc, barium compound, silicon dioxide, alumina, calcium carbonate, synthetic mica, clay, titanium oxide, and complex of these materials. In this regard, the varnish may be selected from the commercially available synthetic resins. Of these synthetic resins, a preferred one is the resin of polyimide system such as polyimide resin, polyamideimide resin, polyesterimide resin, polyimidehydantoic modified polyester resin, etc. One of them or a mixture of two or more of them may be used. Furthermore, the usable inorganic filler includes aluminum hydroxide, talc, barium compound, silicon dioxide, alumina, calcium carbonate, synthetic mica, clay, titanium oxide, and complex of these materials. 5 to 100 parts of one of them by weight may be used. In the case where the insulating varnish comprises a mixture of polyimide resin, and triiron tetraoxide and titanium oxide in the first to third embodiments, particularly, the service life of the electromagnetic coil is improved when dynamoelectric machine is powered by output voltage of an inverter. Consequently, the service life of the electromagnetic equipment is improved. Furthermore, the wear and abrasion resistance of the electromagnetic coil is improved when the insulating varnish comprises a mixture of polyimide resin, and triiron tetraoxide, aluminum hydroxide and alumina. Consequently, the electromagnetic coil is prevented from the machining defect when inserted into the slot of the iron core.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. An electromagnetic equipment comprising an electromagnetic coil formed by winding an insulated wire comprising a bare conductor having two layers of an insulating coating formed by applying a varnish to a surface thereof and baking the varnish and an outer coating formed by applying a coating paint to a surface of the insulating coating and baking the coating paint, the outer coating having a lower resistivity than the insulating coating, the coating paint comprising a mixture of a varnish and an additive containing triiron tetraoxide or talc.

2. An electromagnetic equipment according to claim 1, wherein the electromagnetic coil is divided into a plurality of unit coils each having a plurality of turns and which further comprises a conductive coating member covering an outer periphery of each unit coil.

3. An electromagnetic equipment according to claim 2, further comprising a heat-resistant insulating coating member surrounding an outer periphery of the outer coating of each unit coil.

4. An electromagnetic equipment according to claim 1, wherein the outer coating is formed at least on a portion of the electromagnetic coil in a vicinity of a winding end connected to a power supply.

5. An electromagnetic equipment according to claim 4, wherein the outer coating is formed only on a winding end of the insulated wire forming the electromagnetic coil, the winding end being connected to a power supply.

6. An electromagnetic equipment according to claim 1, wherein the additive contains either triiron tetraoxide or talc and silica.

7. A transformer comprising an electromagnetic coil formed by winding an insulated wire comprising a bare conductor having two layers of an insulating coating formed by applying a varnish to a surface thereof and baking the varnish and an outer coating formed by applying a coating paint to a surface of the insulating coating and baking the coating paint, the outer coating having a lower resistivity than the insulating coating, the coating paint comprising a mixture of a varnish and an additive containing triiron tetraoxide or talc, the electromagnetic coil being enclosed in a resin by casting and including a plurality of block coils located away from each other in the resin and electrically connected in series to each other, wherein the outer coating is formed at least on surfaces of the insulating wires forming the block coils located at respective sides of a beginning and a termination of the coils.

8. A transformer according to claim 7, wherein the outer coating is formed only on the surfaces of the insulating wires forming the block coils located at respective sides of the beginning and the termination of the coils.

9. A transformer according to claim 7, wherein at least one of the block coils constitutes a tap coil and the outer coating is formed at least on the insulating wire forming the tap coil.

10. A transformer according to claim 9, wherein the outer coating is formed only on the insulating wire forming the tap coil.

* * * * *